United States Patent
Parkar et al.

(10) Patent No.: US 9,143,414 B2
(45) Date of Patent: Sep. 22, 2015

(54) SCENARIO, CALL, AND PROTOCOL DATA UNIT HIERARCHICAL COMPARATOR

(75) Inventors: Devendra Parkar, Murphy, TX (US); Sunil Khiani, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 1251 days.

(21) Appl. No.: 12/642,411

(22) Filed: Dec. 18, 2009

(65) Prior Publication Data

US 2011/0153596 A1    Jun. 23, 2011

(51) Int. Cl.
  *G06F 17/30* (2006.01)
  *H04L 12/26* (2006.01)
  *H04L 12/24* (2006.01)

(52) U.S. Cl.
  CPC .............. *H04L 43/062* (2013.01); *H04L 41/22* (2013.01); *H04L 43/12* (2013.01)

(58) Field of Classification Search
  USPC ................................................ 707/723, 778
  See application file for complete search history.

(56) References Cited

U.S. PATENT DOCUMENTS

| | | | |
|---|---|---|---|
| 6,775,240 B1 * | 8/2004 | Zhang et al. | 370/251 |
| 8,302,127 B2 * | 10/2012 | Klarfeld et al. | 725/46 |
| 8,938,758 B2 * | 1/2015 | Klarfeld et al. | 725/46 |
| 2003/0067554 A1 * | 4/2003 | Klarfeld et al. | 348/461 |
| 2005/0240614 A1 * | 10/2005 | Barsness et al. | 707/102 |
| 2006/0206912 A1 * | 9/2006 | Klarfeld et al. | 725/40 |
| 2006/0212904 A1 * | 9/2006 | Klarfeld et al. | 725/46 |
| 2006/0282429 A1 * | 12/2006 | Hernandez-Sherrington et al. | 707/6 |
| 2008/0086750 A1 * | 4/2008 | Yasrebi et al. | 725/86 |
| 2009/0007078 A1 * | 1/2009 | Hoyek et al. | 717/131 |

* cited by examiner

*Primary Examiner* — Kim Nguyen
(74) *Attorney, Agent, or Firm* — Locke Lord LLP; Scott D. Wofsy; Christopher J. Capelli

(57) ABSTRACT

A system, method and computer program product monitors the operation of a telecommunications network and receives source metadata at a metadata comparator. The source metadata is associated with data captured from a source in a telecommunications network. Target metadata associated with target data is also received at the metadata comparator. The source and target metadata are compared to identify metadata parameters that match or do not match. Bias data is also received at the metadata comparator. The bias data comprises weighting parameters and/or tolerance parameters. The weighting and tolerance parameters correspond to selected metadata parameters.

20 Claims, 4 Drawing Sheets

FIG. 5

File Edit View Merge Tools Plugins Capture Analyze Statistics Window Help

Source Capture 501 | Target/Benchmark Capture 502

Source / Target ▼ 503

Scenarios 504 | Scenarios 505

- Scenario 1 | Scenario 1
- Scenario 2 506 | Scenario 2 507

CallTrace Detail Records 508 | CallTrace Detail Records 509

- CDR 1 | CDR 1
- CDR 2 510 | CDR 2 511

Packet Data Units 512 | Packet Data Units 513

| Time | Source | Destination | Protocol | Info |
|---|---|---|---|---|
| 0.000 | 148.188.1.1 | 160.1.1.1. | GTP | Create PDP context requ 514 |
| 0.013 | 160.1.1.1 | 148.188.1.1 | GTP | Create PDP context resp |
| 0.021 | 10.216.188 | 26.1.1.1 | GTP | 1024 > http [SYN] seq=0 |
| 0.030 | 26.1.1.1 | 10.216.188 | GTP | http > 1024 [SYN, ACK] |
| 0.038 | 10.216.188 | 26.1.1.1 | GTP | 1024 > http [ACK] seq=1 |

| Time | Source | Destination | Protocol | Info |
|---|---|---|---|---|
| 0.000 | 148.188.1.1 | 160.1.1.1. | GTP | Create PDP context requ 515 |
| 0.013 | 160.1.1.1 | 148.188.1.1 | GTP | Create PDP context resp |
| 0.021 | 10.216.188 | 26.1.1.1 | GTP | 1024 > http [SYN] seq=0 |
| 0.030 | 26.1.1.1 | 10.216.188 | GTP | http > 1024 [SYN, ACK] |
| 0.038 | 10.216.188 | 26.1.1.1 | GTP | 1024 > http [ACK] seq=1 |

PDU Details 516 | PDU Details 517

GPRS Tunneling Protocol | GPRS Tunneling Protocol
Flags: 0x32 | Flags: 0x32
Message Type: Create PDP context request (0x10) | Message Type: Create PDP context request (0x10)
Length: 140 518 | Length: 136 519 ↖ 520
TEID: 0x00000000 | TEID: 0x00000000
Sequence Number: 0x0001 | Sequence Number: 0x0001

500

SCENARIO, CALL, AND PROTOCOL DATA UNIT HIERARCHICAL COMPARATOR

TECHNICAL FIELD

Embodiments are directed, in general, to analyzing data captured from telecommunications networks and, more specifically, to comparing captured data to benchmark data to identify differences in the captured data.

BACKGROUND

The performance of a telecommunications network may be determined by comparing network data to benchmark data, such as previously captured data that corresponds to an ideal or exemplary situation. The network operator may want to find subsequent data that is similar to the benchmark data. However, it is difficult to compare large amounts of network data to detect similarities to, or differences from, the benchmark data. Additionally, it is difficult to effectively visualize the differences between captured data and benchmark data.

SUMMARY

The scenario, call, and Protocol Data Unit (PDU) comparator is a hierarchical comparator tool that identifies and highlights the differences between capture/call trace files, call scenarios, individual call records and PDUs. Embodiments of the comparator enable a user to compare two or more inputs for the following input source types:
1. Capture files;
2. Call record files or call detail records (CDRs);
3. Call scenarios;
4. Call records; and
5. PDUs.

In one embodiment, the user can invoke the comparator in two modes:
1. Visual Comparator mode that highlights the differences in call records and PDUs and allows the user to navigate through the differences; and
2. Command Line Comparator mode that allows the user to invoke the comparison from a test harness and to store the comparison results as test cases.

In both the modes, the comparator takes into account the user's preferences with respect to which information to discard and any tolerances for the areas of interest. This allows the comparator to remove non-significant information from input sources and to compare the input sources for information of interest to user.

In embodiments of the invention, key benefits of the comparator include:
1. Enabling the user to graphically compare capture/calltrace files, scenarios, call trace records, and PDUs. The comparator enables the user to visually zoom in on the relevant differences at all levels;
2. Enabling comparison of PDU capture files at multiple levels; and
3. Enabling automatic validation of regression tests with packet capture files. An automated tester can use a fast packet capture file comparator tool to quickly compare the capture file from a test run with the reference capture file archived during a baseline run.

A command line comparator algorithm creates capture metadata for each input source capture/calltrace file, scenario, call record, or PDU, if metadata is not available for the captured data. A method used in one embodiment provides a match/no match score by comparing capture metadata from two sources while taking into account the user's comparison preferences. For non-PDU input source types, this method is more efficient than performing a packet-by-packet comparison, especially for repetitive command line comparisons. The comparator also provides details about any capture metadata parameters that do not match, any capture metadata parameters that do match, and any unused capture metadata parameters.

The visual comparator builds a difference database using the input sources. The difference database contains sufficient information to allow the presentation layer to navigate through and to display the differences thereby enabling the visual comparator.

In one embodiment, a system, method and computer program product monitors the operation of a telecommunications network and receives source metadata at a metadata comparator. The source metadata is associated with data captured from a source in a telecommunications network. Target metadata associated with target data is also received at the metadata comparator. The source and target metadata are compared to identify metadata parameters that match or do not match. Bias data is also received at the metadata comparator. The bias data comprises weighting parameters and/or tolerance parameters. The weighting and tolerance parameters correspond to selected metadata parameters.

An input source signal may be processed in a metadata synthesizer to create the source metadata. Similarly, a target signal may be processed in a metadata synthesizer to create the target metadata. The target metadata may correspond to a benchmark data set that is stored in a memory. The metadata parameters that match or do not match may be analyzed to determine if the source meets benchmark criteria. A metadata score may be calculated based upon the metadata parameters that match or do not match.

A comparison of the source metadata and the target metadata is displayed to a user on a graphical user interface. The source metadata and target metadata comparison may include one or more hierarchical data levels selected from the group consisting of: a scenario data level, a calltrace detail record level, a packet data unit level, and a packet data unit detail level. The user can select, via the graphical user interface, a parameter displayed in one of the hierarchical data levels. A lower hierarchical data level corresponding to the selected parameter is displayed in response to the user selection.

In another embodiment, a system, method and computer program product for monitoring IP flows in a network comprises a plurality of monitor probes coupled to links in the network. The monitor probes capture data packets from the links. A processor coupled to the monitor probe synthesizes the captured data packets to generate source metadata and compares the source metadata to target metadata to identify matching metadata parameters in the source and target metadata. A metadata synthesizer is operable to create the target metadata from a target source signal.

A user interface displays the source metadata and the source metadata. The user interface displays a comparison of the source metadata and the target metadata. The comparison display highlights metadata parameters that do not match. The user interface displays one or more hierarchical data levels selected from the group consisting of: a scenario data level, a calltrace detail record level, a packet data unit level, and a packet data unit detail level. The user interface may receive a user selection corresponding to a metadata parameter displayed in one of the hierarchical data levels. A lower hierarchical data level corresponding to the selected parameter is displayed on the user interface in response to the user selection.

A memory stores bias data. The bias data comprising weighting parameters and/or tolerance parameters. The weighting and tolerance parameters correspond to selected metadata parameters. The memory may also store benchmark data. The benchmark data corresponds to the target metadata. The memory is coupled to the processor and provides the bias data and/or the benchmark data to the processor.

BRIEF DESCRIPTION OF THE DRAWINGS

Figure 1:
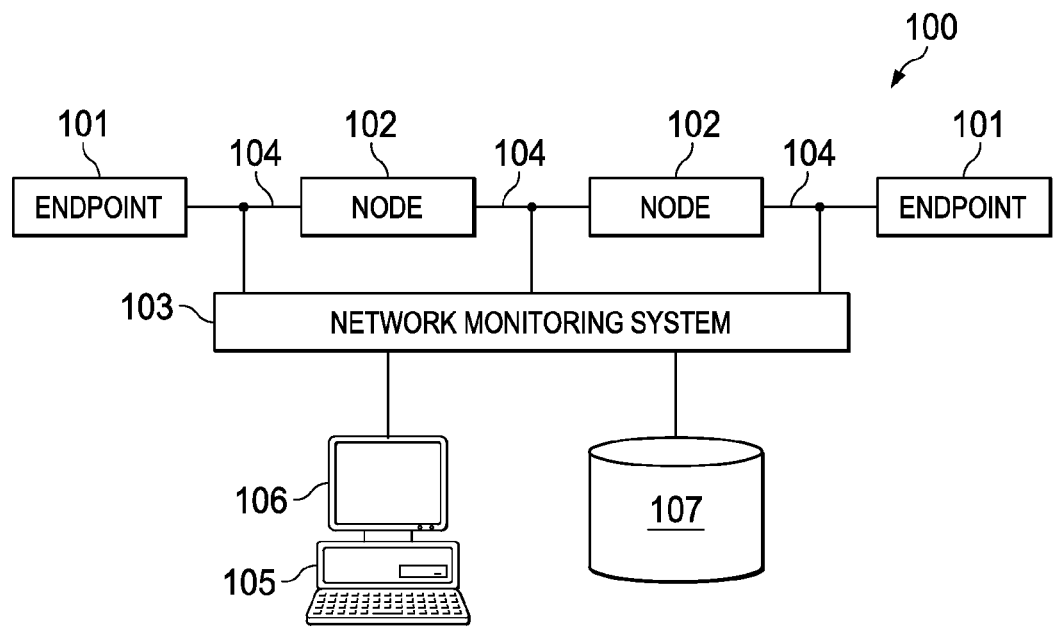
Figure 2:
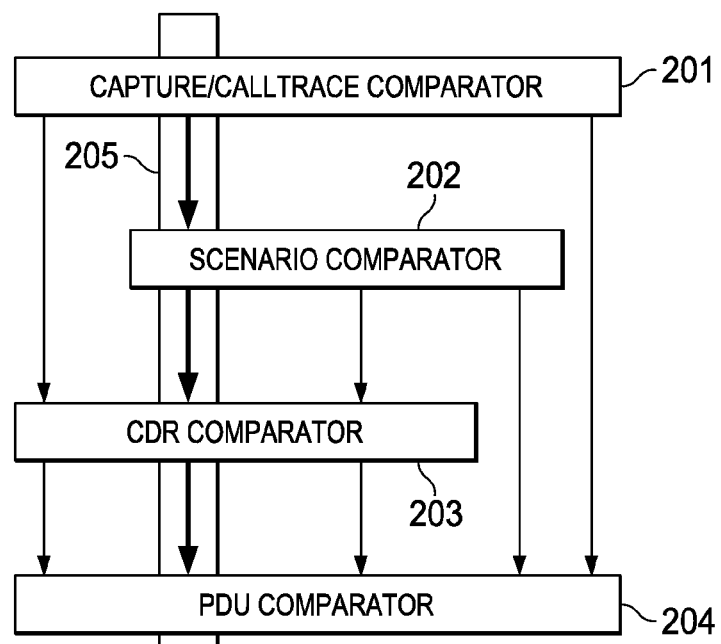
Figure 3:
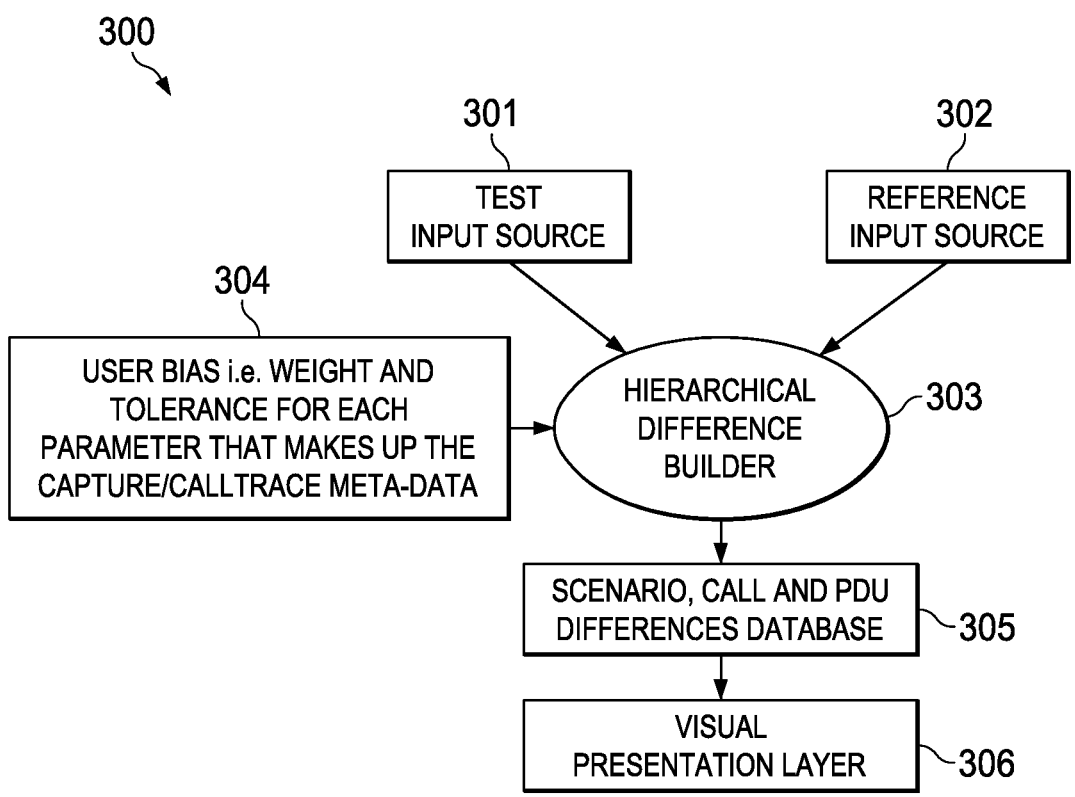
Figure 4:
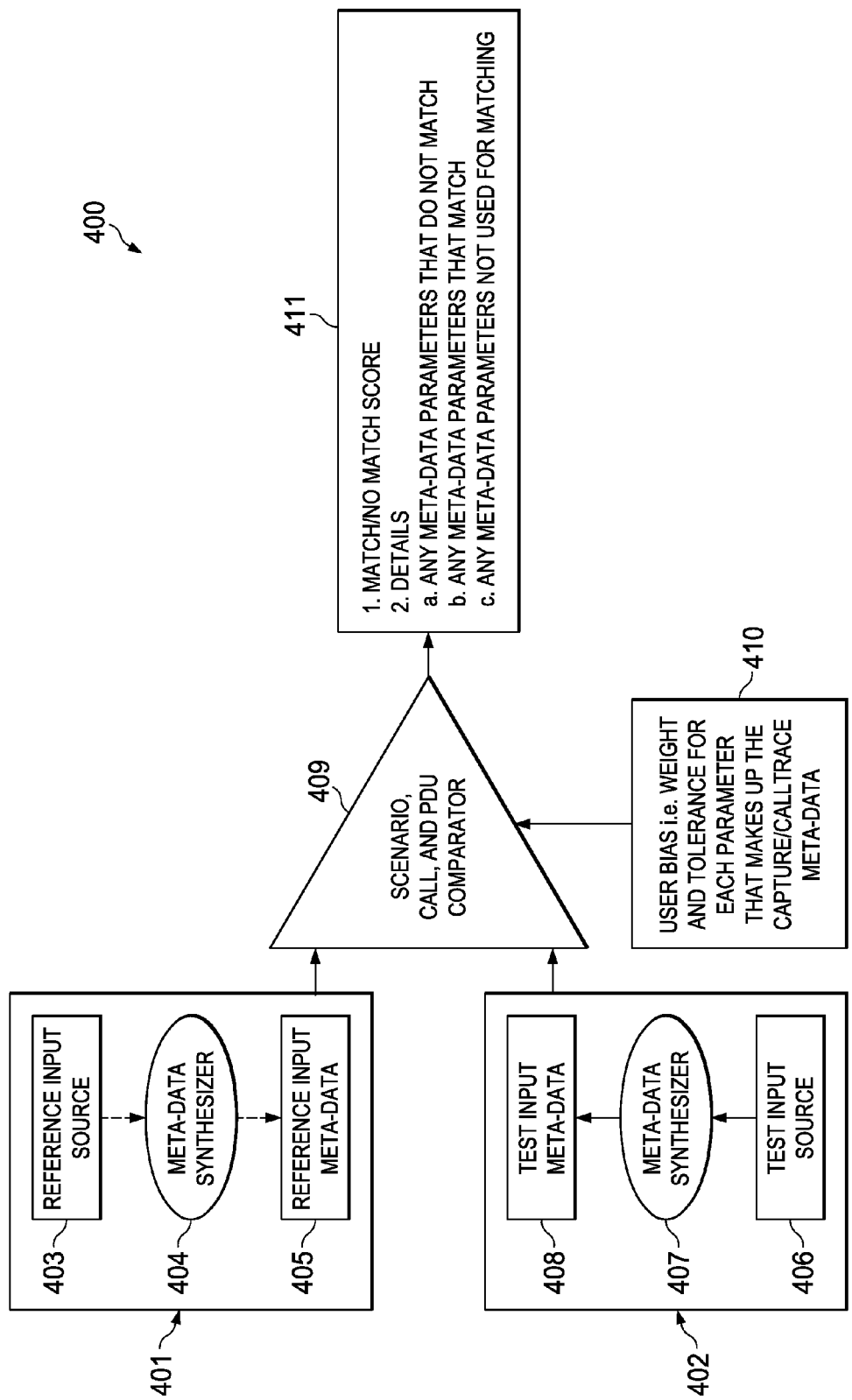

Having thus described the system and method in general terms, reference will now be made to the accompanying drawings, which are not necessarily drawn to scale, and wherein:

FIG. 1 illustrates a high level schematic diagram of network, which comprises network nodes and endpoints;

FIG. 2 illustrates potential drill-down paths using one embodiment of the Visual Comparator components;

FIG. 3 is a flowchart illustrating one embodiment of a scenario, call and PDU Visual Comparator;

FIG. 4 is a flowchart illustrating one embodiment of a scenario, call and PDU Command Line Comparator; and FIG. 5 illustrates an exemplary embodiment of the Visual Comparator according to one embodiment of the invention.

DETAILED DESCRIPTION

FIG. 1 illustrates a high level schematic diagram of network 100, which comprises network nodes 101 and endpoints 101. Although only two nodes 101 and two endpoints 102 are shown in FIG. 1, it will be understood that network 100 may comprise any number of nodes 101 and endpoints 102. Moreover, it will be understood that the nodes 101 and endpoints 102 in network 100 may be interconnected in any manner such as being coupled to one or more other nodes 101 and/or endpoints 102.

Network 100 may represent, for example, a mobile device or user equipment at one endpoint 102 and an Internet based application server at the other endpoint 102. Nodes 101 may be Serving GPRS Support Nodes (SGSN), Gateway GPRS Support Nodes (GGSN), or other core network nodes or routers that transfer data packets or messages between endpoints 102. The messages may be captured in capture files. A call trace application may be used to categorize messages into calls and to create Call Detail Records (CDRs). The calls may belong to scenarios that are based on or defined by the underlying network.

Network monitoring system (NMS) 103 may be used to monitor the performance of network 100. Monitoring system 103 captures packets that are transported across interfaces 104 between nodes 101 and endpoints 102 and any other network links or connections (not shown). In one embodiment, packet capture devices are non-intrusively coupled to network links 104 to capture substantially all of the packets transmitted across the links. Although only three links 104 are shown in FIG. 1, it will be understood that in an actual network there may be dozens or hundreds of physical, logical or virtual connections and links between network nodes.

In one embodiment, network monitoring system 103 is coupled to all or a high percentage of these links. In other embodiments, network monitoring system 103 may be coupled only to a portion of network 100, such as only to links associated with a particular service provider. The packet capture devices may be part of network monitoring system 103, such as a line interface card, or may be separate components that are remotely coupled to network monitoring system 103 from different locations.

Monitoring system 103 preferably comprises one or more processors running one or more software applications that collect, correlate and analyze media and signaling data packets from network 100. Monitoring system 103 may incorporate protocol analyzer, session analyzer, and/or traffic analyzer functionality that provides OSI (Open Systems Interconnection) Layer 2 to Layer 7 troubleshooting by characterizing IP traffic by links, nodes, applications and servers on network 100. Such functionality is provided, for example, by the Iris Analyzer toolset available from Tektronix, Inc. The packet capture devices coupling network monitoring system 103 to links 104 may be high-speed, high-density 10GE probes that are optimized to handle high bandwidth IP traffic, such as the GeoProbe G10 available from Tektronix, Inc. A service provider or network operator may access data from monitoring system 103 via user interface station 105 having a display or graphical user interface 106, such as the IrisView configurable software framework that provides a single, integrated platform for all applications, including feeds to customer experience management systems and operation support system (OSS) and business support system (BSS) applications, which is also available from Tektronix, Inc. Monitoring system 103 may further comprise internal or external memory 107 for storing captured data packets, user session data, call records and configuration information. Monitoring system 103 may capture and correlate the packets associated specific data sessions on links 104. In one embodiment, related packets can be correlated and combined into a record for a particular flow, session or call on network 100.

In embodiments of the present invention, the comparator works on input source files that may come from monitoring system 103 or any other source. The comparator disclosed in embodiments of the present invention may be used to compare any number of input sources. As used in the present disclosure, the following definitions are used. A "capture file" refers to a collection of PDUs. A "calltrace file" refers to a collection of call records. A "scenario" is grouping of call trace records by certain criteria. The call records may be grouped in any number of ways, such as scenarios including grouping call records from various protocols and various call legs belonging to a call, grouping call records between two nodes, and grouping call records between two IP endpoints. The endpoint may be defined as an IP Address, transport, and port.

In one embodiment of the invention, the comparator is a Visual Comparator that allows a user to visually compare differences in the input sources. The Visual Comparator is a hierarchal comparator tool that identifies and highlights the differences between multiple input sources. The input sources may include, for example, capture files, call trace files, call scenarios, individual call records, and PDUs. The Visual Comparator also allows users to navigate through the differences in the input sources, and it highlights the differences in call records and/or PDUS.

FIG. 2 illustrates potential drill-down paths using one embodiment of the Visual Comparator components. Starting with the capture/call comparator, the Visual Comparator allows users to drill-down one level at a time (205) to scenario comparator 202, to CDR (Call Detail Record) comparator 203, and to PDU comparator 204. Alternatively, the Visual Comparator allows the user to drill-down through one or more levels at a time.

FIG. 3 is a flowchart 300 illustrating one embodiment of a scenario, call and PDU Visual Comparator. Test input source 301 and reference input source 302 are input to hierarchical difference builder 303. The input source data may be a capture file, call trace file, scenario, call record, or PDU. Test source 301 may be new data captured from network 100 (FIG. 1), and reference input source 302 may be benchmark data, for example. Hierarchical difference builder 303 comprises comparison logic and algorithms for identifying differences at each level of the input data 301, 302. User bias data 304 is used by hierarchical difference builder 303 to modify how the comparison is conducted. For example, the user may define parameter weights or tolerances. Hierarchical difference builder 303 applies the tolerances to the certain differences between the source files and does not report on the differences if they are within the tolerances. Alternatively, hierarchical difference builder 303 may apply a user weighting to certain source file parameters to adjust the sensitivity of detection of that parameter. Using bias 304, the user is able to customize the function and operation of hierarchical difference builder 303. Scenario, call and PDU differences identified in hierarchical difference builder 303 may be stored in a database (305) and displayed to a user in the visual presentation layer (306).

In one embodiment, hierarchical difference builder 303 identifies individual components in the benchmark input and then identifies the differences in the test input compared to the benchmark input. The differences identified may include, for example, different numbers of packets, scenarios, durations, or numbers of PDUs. More specific differences can be identified, such as identifying different specific PDUs (i.e. a different first PDU in the test source compared to the benchmark source) in two sources or differences in specific fields of captured messages.

Metadata for the captured messages may be used to compare the source input to the benchmark input in hierarchical difference builder 303. The metadata may be any set of data defined by the user in connection to the captured messages. In one embodiment, metadata may be Key Performance Indicators (KPI), but it will be understood by those skilled in the art that metadata may be any characteristic associated with the captured messages and is not limited to KPI. The comparator preferably knows how to process new input data and to create the appropriate metadata, if not already available.

The comparator mechanism may operate at multiple hierarchical levels—capture file, call trace file, scenario, call record, and PDU. These levels are discussed in more detail below.

Input data may be compared to a user-specified call scenario combination. The user can specify combination or grouping of one or more call records and/or PDUs. The comparator searches for this combination in the destination file. The combination format can be constructed from the metadata information of a call record and/or PDUs, such as, for example, protocol, message type, source/destination address.

Input data may be compared to multi-leg correlated call records. When a call record has multiple correlated call legs, the comparator highlights the difference between correlating attributes of the call record. Example of correlating characteristics include, for example, protocol combination, correlation window, total end to end call duration, and cross-message parameters. The correlating attributes can be derived from the other information or may be part of the call record metadata.

Input data may be compared to calltrace files. The comparator would iterate through both the capture files. The call records found at the same location in the capture file are compared. Other metadata values pertaining to the call records may also be compared, such as timestamp, source/destination address, and relative time difference from the last call record. The metadata values may be stored in the calltrace file along with the call record data. The data type the metadata is known to the comparator through the agreed definitions.

Two call records may be compared to each other, instead of being compared to benchmark data. The differences between the two calls are identified by the differences between the metadata of the call record information and/or the differences between corresponding PDUs of the two call records. Per call metadata values may be stored in the call record file or derived from the other information of the call record. Example of this metadata include: protocol type, source/destination, call specific KPIs, media parameters, such as QoS score, jitter, and lost packets.

Two PDUs may be compared to each other, instead of being compared to benchmark data. The differences between two PDUs are identified by structural differences between the PDU and/or the values of the fields or parameters. Structural differences are the differences in the "skeleton" of the PDU pertaining to underlying protocol specifications, such as use of hierarchical relevant address. The structural differences allow or restrict the out-of-order sequencing of parameters or fields as per the underlying protocol specifications. In the case of multiple instances of the same parameter or field type at the same level in the hierarchical skeleton, the comparator matches and highlights the differences in the total number of instances and the mismatch within individual instances. When the structure of all or part of the messages is same, the comparator checks for the content of the relevant field or a parameter. The content is compared for both underlying data type and the value of the content. The user can choose to ignore the highlighted difference for rest of the comparison. The user can also provide tolerances, a range of values, or custom comparison criterions to guide the comparator in comparing the values of fields/parameters. Additionally, a protocol-specific profile can be used to guide the comparator regarding the significance or insignificance of a difference, range of acceptable thresholds for field/parameter, and whether to highlight those differences to the user. The user may make modifications to the profile or create his own profile.

Two capture files may be compared for PDU comparing. The comparator iterates through both the capture files and partitions the files into scenarios, which are then compared. The captured files may be partitioned into CDRs, and the CDRs' compared. The PDUs at the same location in the capture file may also be compared. Additionally, other metadata values pertaining to the PDUs, such as timestamp, source/destination address, and relative time difference from the last PDU, are compared. The metadata values are stored in the capture file along with the PDU data. The comparator knows the metadata data type through agreed definitions.

FIG. 4 is a flowchart 400 illustrating one embodiment of a scenario, call and PDU Command Line Comparator. Two input sources such as capture files, calltrace files, scenarios, multi-protocol call trace records, and PDUs are equivalent if their metadata matches. The metadata may be any set of data defined by the user in connection to the captured messages. Metadata may be Key Performance Indicators (KPI), but it will be understood that the metadata may be any other characteristic associated with the captured messages and is not limited to KPI. In one embodiment, the source file's metadata comprises of, but is not limited to, the following parameters:
  packet count per protocol;
  number of calls per protocol;
  call completion state count per call state;
  call hold time per protocol;
  average media QoS/codec type;
  average, minimum, maximum QoS score/codec type;
  average, minimum, maximum packet length per protocol;
  any PDU parameters;

packet type count within protocol;
packet retransmissions; and/or
packet transmission direction.

Source file comparison may be made by level, where the levels correspond to: capture file, call trace file, scenario, call record, and PDU. In a one embodiment, only metadata that is relevant at each level is generated for that level.

In the Command Line Comparator, input source metadata may be attached to the input source so that the comparator receives this source and metadata together. This combination may occur, for example, when the source is large, such as capture and calltrace files, for time efficient comparison. Fast packet capture file comparator 409 receives two inputs—a reference input 401 and a test input source 402 to be compared to the reference input 401. Reference input source 403 may be processed in a metadata synthesizer 404 to generate reference input metadata 405. Test input source 406 may be processed in a metadata synthesizer 407 to generate test input metadata 408. The input source metadata 405, 408 is optional in the Command Line Comparator, but if present the comparison is completed faster.

Comparator 409 also receives user bias 410, which consists of a weight for each metadata parameter and a tolerance limit for each captured metadata parameter. The fast packet capture file comparator outputs a score (411) that the user can use to determine if input sources match or do not match. The output additionally includes details (411) of any input source metadata parameters that do not match, any input source metadata parameters that match, and any input source metadata parameters that were not used for matching. Fast packet comparator 409 is capable of performing a high-speed comparison because the input source information has been preprocessed to include metadata.

The following use cases provide representative examples of the use of the scenario, call & PDU comparator. These examples are not a complete list and are not intended to limit the scope of the invention.

Use case 1: A user may identify differences between two capture/calltrace files in the hierarchy from scenario-level to call-level to bit-level. The Visual Comparator embodiment described above may be used to compare two capture/calltrace files visually. Differences in the files are highlighted visually, thereby allowing the user to determine differences of in fields of interest and to drill-down the hierarchy.

FIG. 5 illustrates an exemplary embodiment of the Visual Comparator according to one embodiment of the invention. Display 500 may be present to the user via user interface or user terminal 106 (FIG. 1), for example. Display 500 is a visual output enabled by the scenario, call & PDU comparator. The user may select source capture data 501 and target capture data 502 to be compared on display 500. In one embodiment, the target capture data 502 is benchmark data. Display 500 illustrates an example configuration in which the user has started at a scenario level and drilled-down to view details regarding specific PDUs.

The user may select the source and target data to be viewed using, for example, a drop-down menu 503, or any other file selection method available in a typical graphical user interface (GUI), such as display 500. Once the user has selected the source and target capture data for observation, a list of scenarios 504, 505 that are relevant to the source and target data are shown. The user may highlight selected scenarios 506, 507 for further analysis and/or comparison. Alternatively, the Visual Comparator application may automatically highlight scenarios 506, 507 that include differences in lower-level data. Although the term "scenario" is used in the example displays 504, 505, it will be understood that specific scenario names may be used in those displays to identify generic or user-defined scenarios.

After selecting scenarios 506, 507, a list of relevant CallTrace Detail Records (CDRs) 508, 509 are displayed for the selected source and target data. Again, the user may highlight selected scenarios 510, 511 for further analysis and/or comparison. Alternatively, the Visual Comparator application may automatically highlight scenarios 510, 511 that include differences in lower-level data. Although the term "calltrace detail record" is used in the example displays 508, 509, it will be understood that specific CDR names or other identifiers may be used in those displays to identify the CDRs.

When specific CDRs 510, 511 are selected, the PDUs 512, 513 for each CDR are displayed. The user may configure the detail level shown for each PDU. In the example of FIG. 5, the PDU data includes the time, source, destination, protocol, and general information for each packet. Other data or information may be shown in displays 512, 513 as selected according to the user's preference. The user may highlight selected scenarios 514, 515 for further analysis and/or comparison. Alternatively, the Visual Comparator application may automatically highlight scenarios 514, 515 if, for example, those PDUs include differences in lower-level data.

Upon selection of PDUs 514, 515, detailed PDU information 516, 517 is displayed to the user. The user may visually compare the PDU details to identify any differences. In the example display 500, PDU Length parameters 518, 519, which have different values, are selected by the user or may be automatically highlighted by the Visual Comparator. Using the Visual Comparator, the user can drill-down from a particular scenario, such as "Scenario 2," to the values for specific PDU parameters.

Although the information in each level shown in display 500—i.e. scenario, CDR, PDU list, PDU details—is shown side-by-side, it will be understood that any other configuration may be used, such as displaying one or more level side-by-side or above-and-below each other. Additionally, although the example in display 500 indicates that the user has started at the scenario level and drilled down to the PDU details level in a level-by-level manner, it will be understood that the user may start at any level and may jump directly to view details in any lower level without having to proceed on a level-by-level basis.

The user may use a pointing device, such as a mouse, to position a cursor 520 over the displayed scenarios, CDRs, PDUs, PDU details or other fields of interest and to select the items for additional analysis. With a context sensitive mouse click, the user can add field to ignore, fields of interest, or change tolerances for fields of interest. After making such changes, display 500 is updated as appropriate to highlight differences to the user based upon the updated selections.

Use case 1 allows the user to visually compare differences between two sources files, such as between benchmark data and newly captured data. The visual display allows the user to identify highlighted differences between the sources. The user can then select highlighted fields to view more details about the differences or the highlighted data.

Use case 2: The scenario, call & PDU comparator can be used for quick verification of equipment operation, such as by a carrier or manufacturer. For example, if an equipment manufacturer modifies software for an existing product, the manufacturer may desire to quickly verify that the new software version meets benchmark criteria. Test groups usually run tests on new software versions and save reference results that include a PDU capture/calltrace file. This file may be compared in a command line comparator or a visual comparator to a benchmark file. The manufacturer can quickly identify and evaluate and differences between the data captured using the new software version compared to the benchmark results.

The certain PDUs may be ignored during the benchmark evaluation, if they are not relevant to the verification. For example, the time stamps of PDUs that are identified as different between the files are irrelevant since the tests are performed at different times. Accordingly, the PDU timestamps may be ignored. Extra keep-alive PDUs that are identified in the verification can be ignored during comparison. Additionally, minor timing differences that are within user-set tolerance limits would be acceptable in the verification test. The call & PDU comparator can be used to verify the result of a test run against a previously validated reference PDU capture/calltrace file.

Use case 3: A test automation tool can provide a capture metadata file, a test run capture file, and user bias preferences to the capture file test comparator. The test automation tool uses a matching-score output of the fast capture file comparator to determine if the test passed or failed. Note that the test does not have to store huge capture files in this use case.

Use case 4: A user may compare one set of PDU against another set of PDUs from the same capture file using the comparator. The user can also compare one set of call records against another set of call records from the same calltrace file using the comparator.

Use case 5: The user can compare captured data from a reference conformance test run with later conformance test runs. This allows the user to evaluate the conformance test runs at a later time rather than in real-time.

In one embodiment, network monitoring system 103 captures PDUs from network links 104 and stores them in database 107. User interface station 105 having a display or graphical user interface 106 is used to run the scenario, call, and PDU comparator. User interface station 105 is a processor-based device running software applications, including the visual and command-line comparator applications. The comparator applications receive commands and inputs from the user and provide information to the user via graphical user interface 106, for example. In one embodiment, software for the scenario, call, and PDU comparator application may be stored on database 107, which may be internal or external to station 105 or network monitoring system 103.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. Other features, aspects, and objects of the invention can be determined from a review of the specification, the figures, and the claims.

What is claimed is:

1. A method, comprising:
performing, by a telecommunications network monitoring system,
receiving, at a metadata comparator, source metadata associated with source data captured from a source endpoint device in a telecommunications network, the source data including at least a portion of a first call record;
receiving, at the metadata comparator, target metadata associated with target data, the target data including at least a portion of a second call record, wherein receiving the source metadata includes processing the portion of the first call record in a metadata synthesizer to create the source metadata, the source metadata including at least one of: a packet count per protocol, a number of calls per protocol, a call completion state count per call state, a call hold time per protocol, a packet length per protocol, a packet type count within protocol, a packet retransmission, or a packet transmission direction;
comparing the source and target metadata; and
in response to a parameter within the source metadata not matching a corresponding parameter within the target metadata as a result of the comparison, indicating the mismatch via a graphical user interface.

2. The method of claim 1, further comprising:
performing, by the telecommunications network monitoring system,
receiving bias data at the metadata comparator, the bias data comprising at least one of: a parameter weight or a parameter tolerance; and
determining that the parameter within the source metadata does not match the corresponding parameter within the target metadata after taking at least one of the parameter weight or the parameter tolerance into account.

3. The method of claim 1, wherein receiving the target metadata includes processing the target data in a metadata synthesizer to create the target metadata, the target metadata including at least one of: a packet count per protocol, a number of calls per protocol, a call completion state count per call state, a call hold time per protocol, a packet length per protocol, a packet type count within protocol, a packet retransmission, or a packet transmission direction.

4. The method of claim 1, wherein the target data includes benchmark data.

5. The method of claim 4, further comprising:
performing, by the telecommunications network monitoring system,
determining if the source endpoint device meets a benchmark criteria.

6. The method of claim 1, further comprising:
performing, by the telecommunications network monitoring system,
providing a display including a comparison of parameters within the source metadata and corresponding parameters within the target metadata via the graphical user interface.

7. The method of claim 6, wherein the display comprises two or more hierarchical data levels selected from the group consisting of: a scenario data level, a calltrace detail record level, a packet data unit level, and a packet data unit detail level.

8. The method of claim 6, further comprising:
performing, by the telecommunications network monitoring system,
receiving a user selection via the graphical user interface, wherein the user selection corresponds to a parameter displayed in a hierarchical data level selected from the group consisting of: a scenario data level, a calltrace detail record level, and a packet data unit level; and
displaying a lower hierarchical data level corresponding to the selected parameter.

9. The method of claim 1, further comprising:
performing, by the telecommunications network monitoring system, generating a metadata score based upon corresponding parameters within the source and target metadata that match or do not match each other.

10. A telecommunications monitoring system, comprising:
a processor; and
a memory coupled to the processor, the memory configured to store program instructions executable by the processor to cause the telecommunications monitoring system to:
receive data packets from a plurality of monitor probes coupled to physical links in a telecommunications network, the monitor probes configured to capture the data packets from the physical links during a telephone call;
generate source metadata based upon the received data packets;
compare the source metadata to target metadata to identify matching
metadata parameters in the source and target metadata; and display the matching metadata parameters via a graphical user interface.

11. The telecommunications monitoring system of claim 10, the memory further configured to store bias data, the bias data comprising at least one of: a parameter weight or a parameter tolerance, and wherein the comparison takes at least one of the parameter weight or the parameter tolerance into account in identifying the matching metadata parameters.

12. The telecommunications monitoring system of claim 10, the program instructions further executable by the processor to cause the telecommunications monitoring system to:
create the target metadata from a target source signal.

13. The telecommunications monitoring system of claim 10, the memory further configured to store benchmark data, the benchmark data corresponding to the target metadata.

14. The telecommunications monitoring system of claim 10, wherein the graphical user interface further comprises a side-by-side comparison between the source metadata and the target metadata, the comparison highlighting corresponding metadata parameters that do not match each other, the source and target metadata including at least one of: a packet count per protocol, a number of calls per protocol, a call completion state count per call state, a call hold time per protocol, a packet length per protocol, a packet type count within protocol, a packet retransmission, or a packet transmission direction.

15. The telecommunications monitoring system of claim 10, wherein the graphical user interface is configured to concurrently display a plurality of hierarchical data levels selected from the group consisting of: a scenario data level, a calltrace detail record level, a packet data unit level, and a packet data unit detail level.

16. The telecommunications monitoring system of claim 15, wherein the graphical user interface is configured to receive a user selection corresponding to a metadata parameter displayed in one of the plurality of hierarchical data levels, and to display a lower hierarchical data level corresponding to the selected parameter in response to the user selection.

17. A non-transitory computer program product that includes a computer readable medium useable by one or more processors, the medium having stored thereon a sequence of instructions which, upon execution by the one or more processors, causes the one or more processors to:
receive source metadata associated with data packets captured by a monitoring probe from a source endpoint device in a mobile telecommunications network, the source metadata including at least one of: a packet count per protocol, a number of calls per protocol, a call completion state count per call state, a call hold time per protocol, a packet length per protocol, a packet type count within protocol, a packet retransmission, or a packet transmission direction;
receive target metadata associated with target data;
compare the source and target metadata; and
identify, as a result of the comparison, corresponding metadata parameters within the source and target metadata that match or do not match each other.

18. The computer program product of claim 17, wherein the sequence of instructions, upon execution by the one or more processors, further causes the one or more processors to:
receive bias data, the bias data comprising at least one of: a parameter weight or a parameter tolerance; and
determine that the parameter within the source metadata does not match the corresponding parameter within the target metadata after taking at least one of the parameter weight or the parameter tolerance into account.

19. The computer program product of claim 17, wherein the target metadata corresponds to a benchmark data set, and wherein the sequence of instructions, upon execution by the one or more processors, further causes the one or more processors to:
receive the benchmark data set from a memory; and
determine if the source meets a benchmark criteria based upon the comparison.

20. The computer program product of claim 17, wherein the sequence of instructions, upon execution by the one or more processors, further causes the one or more processors to:
receive an input source signal from the source endpoint device;
create the source metadata based on the input source signal;
receive a target signal; and
create the target metadata based on the target signal.

* * * * *

UNITED STATES PATENT AND TRADEMARK OFFICE
CERTIFICATE OF CORRECTION

PATENT NO. : 9,143,414 B2
APPLICATION NO. : 12/642411
DATED : September 22, 2015
INVENTOR(S) : Devendra Parker et al.

It is certified that error appears in the above-identified patent and that said Letters Patent is hereby corrected as shown below:

Claims

Claim 17: Column 12, line 6, delete "non-transitory" before "computer program;" and add "non-transitory" before "computer readable" at Column 12, line 7.

Signed and Sealed this
Fourteenth Day of June, 2016

Michelle K. Lee
*Director of the United States Patent and Trademark Office*